(12) United States Patent
Kouno

(10) Patent No.: US 7,874,956 B2
(45) Date of Patent: Jan. 25, 2011

(54) ENGINE START CONTROLLING APPARATUS AND METHOD FOR HYBRID VEHICLE

(75) Inventor: Kazuyuki Kouno, Hiratsuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 840 days.

(21) Appl. No.: 11/752,376

(22) Filed: May 23, 2007

(65) Prior Publication Data

US 2007/0275818 A1 Nov. 29, 2007

(30) Foreign Application Priority Data

May 24, 2006 (JP) .............................. 2006-143589
Apr. 10, 2007 (JP) .............................. 2007-102810

(51) Int. Cl.
*B60W 10/02* (2006.01)

(52) U.S. Cl. .......................................... 477/5; 477/167

(58) Field of Classification Search ........................ None
See application file for complete search history.

(56) References Cited

U.S. PATENT DOCUMENTS

| 2005/0101433 | A1* | 5/2005 | Joe ............................... 477/5 |
| 2005/0155803 | A1 | 7/2005 | Schiele |
| 2006/0089235 | A1* | 4/2006 | Kobayashi .................. 477/107 |

FOREIGN PATENT DOCUMENTS

| EP | 1 529 672 A2 | 5/2005 |
| JP | 10-002241 A | 1/1998 |
| JP | H11-082260 | 3/1999 |
| JP | 2000-255285 | 9/2000 |
| JP | 2003-293816 A | 10/2003 |
| JP | 2005-221073 A | 8/2005 |

\* cited by examiner

*Primary Examiner*—David D Le
*Assistant Examiner*—Erin D Bishop
(74) *Attorney, Agent, or Firm*—Young Basile

(57) ABSTRACT

A hybrid-vehicle engine start controlling apparatus includes an engine, a motor connected to a vehicle driving shaft, a first engaging element provided between the engine and the motor for connecting and disconnecting the engine and the motor and engine start control means. The engine start controlling means is configured to start the engine by increasing a driving torque of the motor and increasing a transmission torque capacity of the first engaging element so as to increase a rotation speed of the engine by the driving torque of the motor in a state in which the engine is stopped and the first engaging element is released. The engine start controlling means includes a first engaging phase for increasing the transmission torque capacity of the first engaging element at a first velocity, and a second engaging phase for changing the transmission torque capacity at a second velocity lower than the first velocity.

15 Claims, 10 Drawing Sheets

ENGINE START CONTROLLING APPARATUS AND METHOD FOR HYBRID VEHICLE

CROSS-REFERENCE TO RELATED APPLICATIONS

This application claims priority from Japanese Patent Application Serial Nos. 2006-143589, filed May 24, 2006, and 2007-102810, filed Apr. 10, 2007, each of which is incorporated herein in its entirety by reference.

FIELD OF THE INVENTION

The invention relates generally to a hybrid vehicle capable of traveling by power from a motor as well as by an engine.

BACKGROUND

Hybrid vehicles have an electric drive (EV) mode, in which the hybrid vehicle travels only by power from the motor-generator, and a hybrid drive (HEV) mode, in which the hybrid vehicle can travel by power from both the engine and the motor-generator. Japanese Unexamined Patent Application Publication No. H11-82260 discloses an engine start controlling apparatus for a hybrid vehicle that runs in an EV mode and an HEV mode. In this controlling apparatus, when the vehicle is switched from the EV mode to the HEV mode, a clutch provided between a motor and an engine is engaged, and the engine is started by the motor that is currently powering the vehicle. This allows the engine to be started without using a starter motor.

BRIEF SUMMARY OF THE INVENTION

Embodiments of a hybrid-vehicle engine start controlling apparatus and method are taught herein. One embodiment of the invention includes an engine, a motor disposed between the engine and a vehicle driving shaft, a first clutch disposed between the engine and the motor, the first clutch operable to engage and disengage the engine and a controller. The controller is configured to increase a driving torque of the motor in response to a request for an increase in a driving force and start the engine from a disengaged state, including increase a transmission torque capacity of the first clutch at a first velocity in a first engaging phase and change the transmission torque capacity of the first clutch at a second velocity slower than the first velocity in a second engaging phase after the first engaging phase is complete.

Another embodiment of a hybrid-vehicle engine start control system taught herein comprises an engine, a motor disposed between the engine and a vehicle driving shaft, a first clutch disposed between the engine and the motor, the first clutch engaging and disengaging the engine and a controller. The controller is operable to start the engine from a disengaged state and is configured to increase a driving torque of the motor, increase a transmission torque capacity of the first clutch to a torque required to start the engine, thereby initiating a rotation speed of the engine and fiber increase the transmission torque capacity of the first clutch until the rotational speed of the engine conforms to a rotational speed of the motor.

Engine controllers for a hybrid vehicle are taught herein. The vehicle includes a motor, an engine and a first clutch disposed between the motor and the engine to engage and disengage the engine. One embodiment of such a controller comprises means for increasing a driving torque of the motor, means for increasing a transmission torque capacity of the first clutch at a first velocity and means for changing the transmission torque capacity of the first clutch to a second velocity slower than the first velocity so as to conform a rotation speed of the engine to a rotation speed of the motor.

Methods for controlling the engine start of a hybrid-vehicle are also taught herein. The hybrid-vehicle includes a motor, an engine and a first clutch disposed between the motor and the engine to engage and disengage the engine. One embodiment of such a method comprises increasing a driving torque of the motor, increasing a transmission torque capacity of the first clutch at a first velocity and changing the transmission torque capacity of the first clutch to a second velocity slower than the first velocity so as to conform a rotation speed of the engine to a rotation speed of the motor.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the conventional engine start controlling apparatus, if the transmission torque capacity of the clutch is gradually increased at the start of the engine, a torque corresponding to the transmission torque capacity is lost from the motor. Therefore, when the engine starts during driving, the torque acting on the output shaft decreases, and the driver may feel that the driving force of the vehicle has decreased. Herein, the transmission torque capacity refers to the upper limit of torque that can be transmitted by an engaging element such as a clutch. When a torque less than or equal to the transmission torque capacity is transmitted by the clutch, the entire torque is transmitted. In contrast, when a torque more than the transmission torque capacity is input, only the torque corresponding to the transmission torque capacity is transmitted.

Conventionally, there is no technique for preventing the decrease in driving force during mode shifting from EV to HEV mode of a hybrid vehicle. Accordingly, embodiments of the invention taught herein provide an engine start controlling apparatus and an engine start controlling method for a hybrid vehicle that prevents a driver from feeling that the driving force of the vehicle has decreased, even when an engine is started by a motor that is being used as a power source during driving.

Certain embodiments of the invention are next described in detail with reference to the accompanying drawings.

Figure 1:
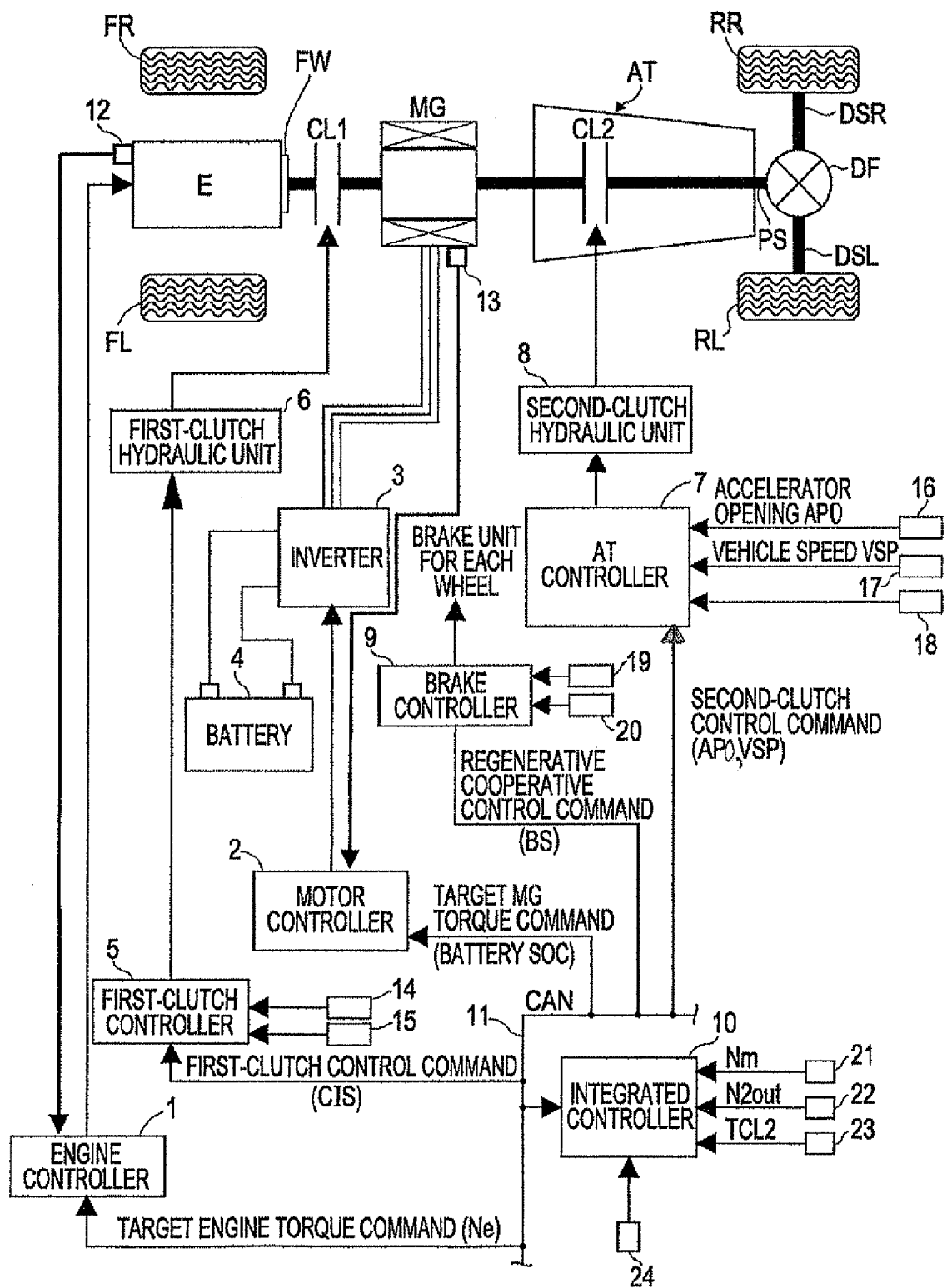
FIG. 1 is an overall system view of a rear-drive hybrid vehicle to which an embodiment of an engine start controlling apparatus is applied.

FIG. 1 is an overall system view of a rear-drive hybrid vehicle incorporating an embodiment of an engine start controlling apparatus. As shown in FIG. 1, the driving system of the hybrid vehicle includes an engine E, a first clutch CL1, a motor/generator MG, a second clutch CL2, an automatic transmission AT, a propeller shaft PS serving as a vehicle driving shaft, a differential DF, a left drive shaft DSL, a right drive shaft DSR, a left rear wheel RL (driving wheel) and a right rear wheel RR (driving wheel). In FIG. 1, FL denotes a left front wheel, and FR denotes a right front wheel.

The engine E is, for example, a gasoline engine. The valve opening of a throttle valve is controlled by a command from an engine controller 1 described below. A flywheel FW is provided on an engine output shaft.

The first clutch CL1 is disposed between the engine E and the motor/generator MG. Engagement and disengagement, including slip engagement, of the first clutch CL1 are controlled by hydraulic pressure generated by a first-clutch hydraulic unit 6 according to a control signal from a first-clutch controller 5 described below.

The motor/generator MG is a synchronous motor/generator in which a permanent magnet is buried in a rotor and a stator coil is wound around a stator. The motor/generator MG is controlled by the application of a three-phase alternating current generated by an inverter 3 according to a control command from a motor controller 2 described below. The motor/generator MG can operate as an electric motor that is rotated by power supplied from a battery 4 (hereinafter, this operating state will be referred to as "powering"), and can also operate as a power generator that generates electromotive force at both ends of the stator coil so as to charge the battery 4 when the rotor is rotated by external force (hereinafter, this operating state will be referred to as "regeneration"). The rotor of the motor/generator MG is connected to an input shaft of the automatic transmission AT via a damper (not shown).

The second clutch CL2 is disposed between the motor/generator MG and the right and left rear wheels RR and RL. Engagement and disengagement, including slip engagement, of the second clutch CL2 are controlled by hydraulic pressure generated by a second-clutch hydraulic unit 8 according to a control command from an AT controller 7 described below.

The automatic transmission AT automatically switches a gear ratio among multiple gears, for example, five forward gears and one reverse gear, in accordance with a vehicle speed VSP and an accelerator opening APO. The second clutch CL2 is not provided as a dedicated clutch according to the example shown, but is formed by some of a plurality of frictional engaging elements that are engaged at the shift positions in the automatic transmission AT. An output shaft of the automatic transmission AT is connected to the right and left rear wheels RR and RL via the propeller shaft PS, the differential DF, the left drive shaft DSL, and the right drive shaft DSR. For example, each of the first clutch CL1 and the second clutch CL2 may be formed of a multiplate wet clutch that allows the amount and pressure of hydraulic fluid to be continuously controlled by a proportional solenoid.

This hybrid drive system includes two drive modes corresponding to the engaging and disengaging states of the first clutch CL1. One drive mode is an electric vehicle drive mode (hereinafter abbreviated as "EV mode"), in which driving is performed by using only power from the motor/generator MG. The other drive mode is a hybrid electric vehicle drive mode (hereinafter abbreviated as "HEV mode"), in which driving is performed with the first clutch CL1 engaged and the engine E also used as the power source.

The above-described HEV mode includes three drive modes, namely, an engine drive mode, a motor-assisted drive mode, and a power-generation drive mode.

In the engine drive mode, the driving wheels RR and RL are driven by using only the engine E as a power source. In the motor-assisted drive mode, the driving wheels RR and RL are driven by using the engine E and the motor/generator MG as power sources. In the power-generation drive mode, the driving wheels RR and RL are driven by using the engine E as a power source, and the motor/generator MG operates as a power generator.

During constant-speed driving and accelerated driving, power of the engine E is used, and the motor/generator MG is operated as the power generator. During decelerated driving, the motor/generator MG generates power by regenerating brake energy, and the generated power is used to charge the battery 4.

A description is now given of a control system of the hybrid vehicle. As shown in FIG. 1, an embodiment of the control system of the hybrid vehicle includes an engine controller 1, a motor controller 2, an inverter 3, a battery 4, a first-clutch controller 5, a first-clutch hydraulic unit 6, an AT controller 7, a second-clutch hydraulic unit 8, a brake controller 9 and an integrated controller 10. The engine controller 1, the motor controller 2, the first-clutch controller 5, the AT controller 7, the brake controller 9, and the integrated controller 10 are connected to one another via a CAN communication line 11 through which information can be exchanged among the controllers.

The engine controller 1 receives information about the engine speed from an engine speed sensor 12, and outputs a command to control engine operating points (Ne: engine speed, Te: engine torque) to, for example, a throttle valve actuator (not shown) according to a target engine torque command from the integrated controller 10. Information about the engine speed Ne is supplied to the integrated controller 10 via the CAN communication line 11.

The motor controller 2 receives information about the rotor rotating position of the motor/generator MG from a resolver 13 and outputs a command to control motor operating points (Nm: motor/generator speed, Tm: motor/generator torque) of the motor/generator MG to the inverter 3 according to a target motor/generator torque command from the integrated controller 10. The motor controller 2 also monitors battery information SOC indicating the state of charge of the battery 4. The battery information SOC is used to control the motor/generator MG and is supplied to the integrated controller 10 via the CAN communication line 11.

The first-clutch controller 5 receives sensor information from a first-clutch hydraulic sensor 14 and a first-clutch stroke sensor 15 and outputs a command to control engagement and disengagement of the first clutch CL1 to the first-clutch hydraulic unit 6 according to a first-clutch control command from the integrated controller 10. First-clutch stroke information C1S is supplied to the integrated controller 10 via the CAN communication line 11.

The AT controller 7 receives sensor information from an accelerator opening sensor 16, a vehicle speed sensor 17 and a second-clutch hydraulic sensor 18. Using these inputs, the AT controller 7 outputs a command to control engagement and disengagement of the second clutch CL2 to the second-clutch hydraulic unit 8 provided in an AT hydraulic control valve according to a second-clutch control command from the integrated controller 10. Accelerator opening information APO and vehicle speed information VSP are supplied to the integrated controller 10 via the CAN communication line 11.

The brake controller 9 receives sensor information from a wheel speed sensor 19 for detecting the speeds of the four wheels and a brake stroke sensor 20. For example, when regenerative braking force is less than the required braking force indicated by the brake stroke BS when the brake is pressed, the brake controller 9 exerts regenerative cooperative brake control according to a regenerative cooperative control command from the integrated controller 10 so that the shortfall is covered by a mechanical braking force (braking force of a frictional brake).

The integrated controller 10 manages the energy consumption of the entire vehicle so that the vehicle can run at its most efficient. The integrated controller 10 receives information from a motor speed sensor 21 for detecting a motor speed Nm, a second-clutch output speed sensor 22 for detecting a second-clutch output rotation speed N2out, a second-clutch torque sensor 23 for detecting a second-clutch torque TCL2, and a brake hydraulic sensor 24. The integrated controller 10 also receives information via the CAN communication line 11.

Further, the integrated controller 10 controls the operation of the engine E by a control command to the engine controller 1, the operation of the motor/generator MG by a control command to the motor controller 2, the engagement and disengagement of the first clutch CL1 by a control command to the first-clutch controller 5, and the engagement and disengagement of the second clutch CL2 by a control command to the AT controller 7. Each controller described herein, including the integrated controller 10, generally consists of a microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed herein. The functional (or processing) units of the integrated controller 10 described herein could be, for example, implemented in software as the executable programs, or could be implemented in whole or in part by separate hardware in the form of one or more integrated circuits (IC). Also, although each of the controllers is shown as a separate device, the controllers can be implemented by fewer devices, including a common device.

Figure 2:
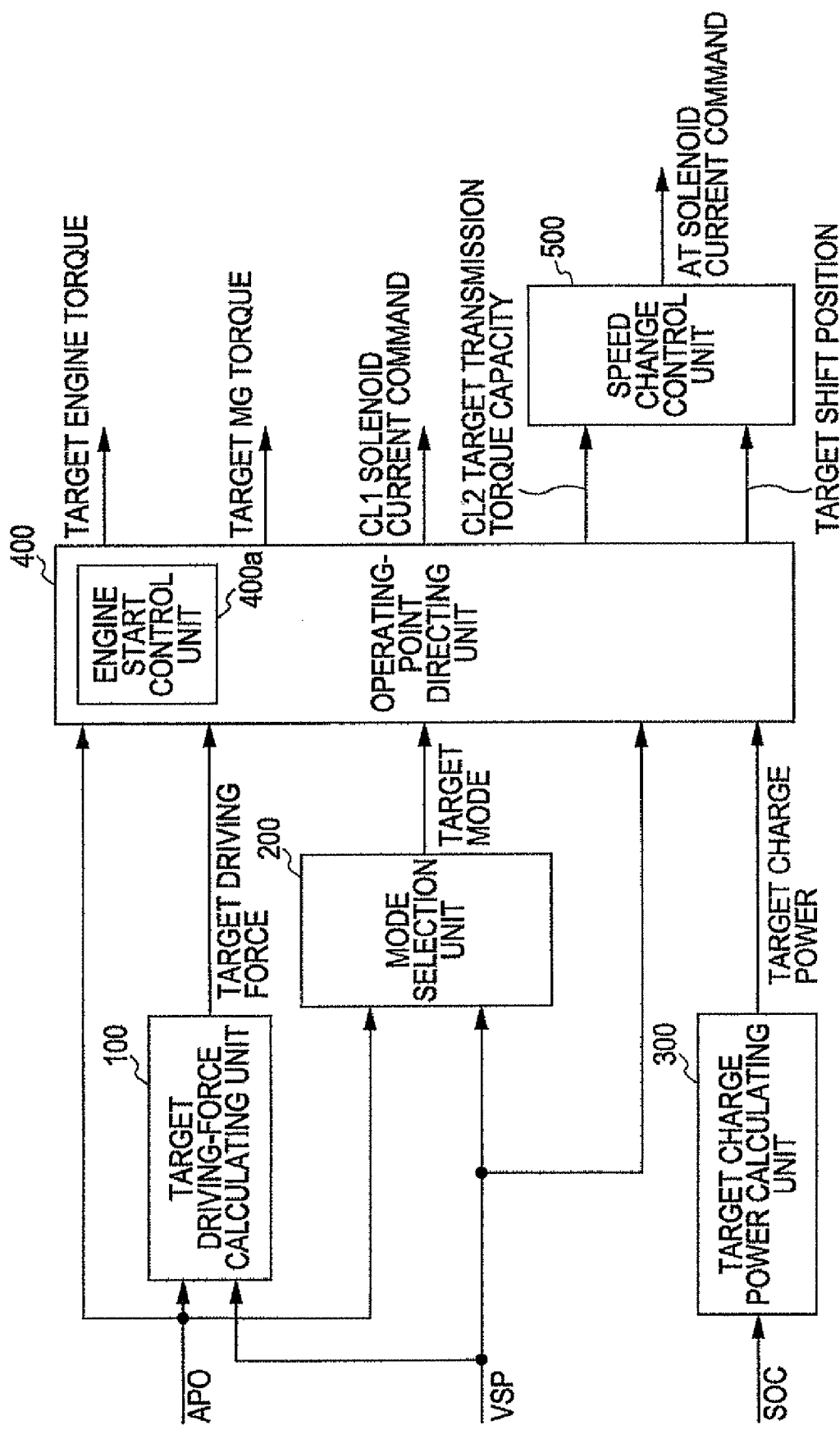
FIG. 2 is a control block diagram showing a processing program of an integrated controller in a first embodiment.

Control processing performed by the integrated controller 10 in a first embodiment is described below with reference to FIG. 2. The integrated controller 10 performs this processing in a control cycle of 10 msec. The integrated controller 10 includes a target driving-force calculating unit 100, a mode selection unit 200, a target charge-power calculating unit 300, an operating-point directing unit 400 and a speed change control unit 500.

Figure 3:
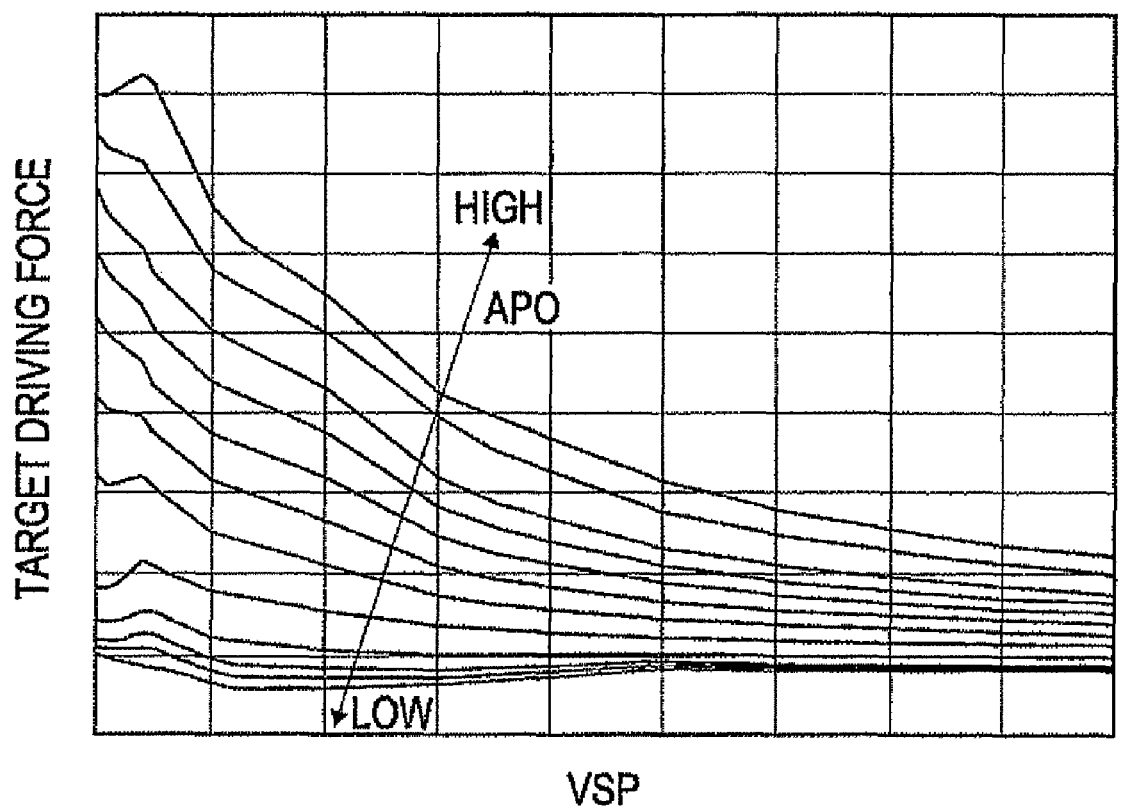
FIG. 3 is an explanatory view of a target driving-force map used to calculate a target driving force in the target driving-force calculating unit shown in FIG. 2.

The target driving-force calculating unit 100 calculates a target driving force tFo0 based on the accelerator opening APO and the vehicle speed VSP with reference to a target driving-force map such as that shown in FIG. 3.

Figure 4:
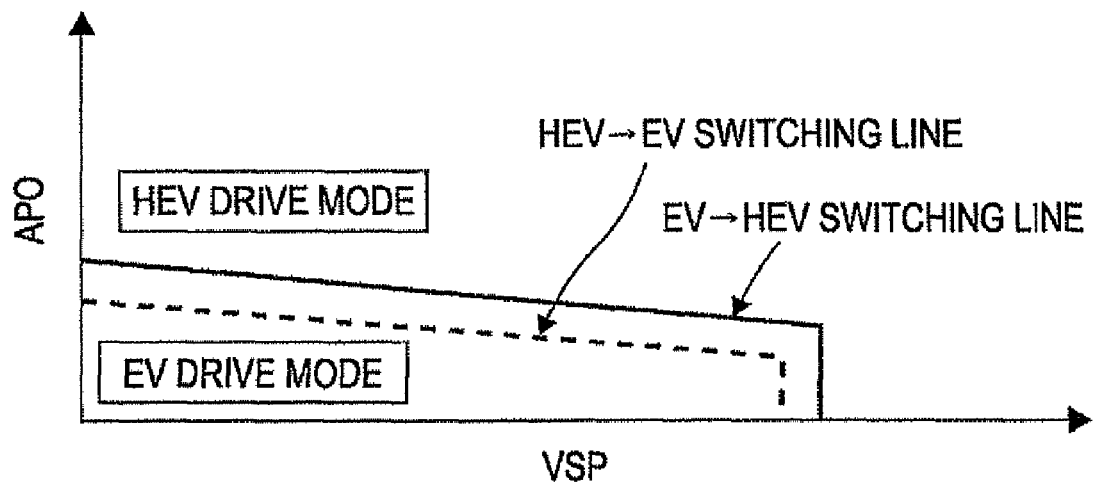
FIG. 4 is an explanatory view of a target mode map used to select a target mode in the mode selection unit shown in FIG. 2.

The mode selection unit 200 calculates a target mode based on the accelerator opening APO and the vehicle speed VSP with reference to an EV-HEV selection map such as that shown in FIG. 4. When the battery information SOC indicates a value less than or equal to a predetermined value, an HEV drive mode is forcibly selected as the target mode.

Figure 5:
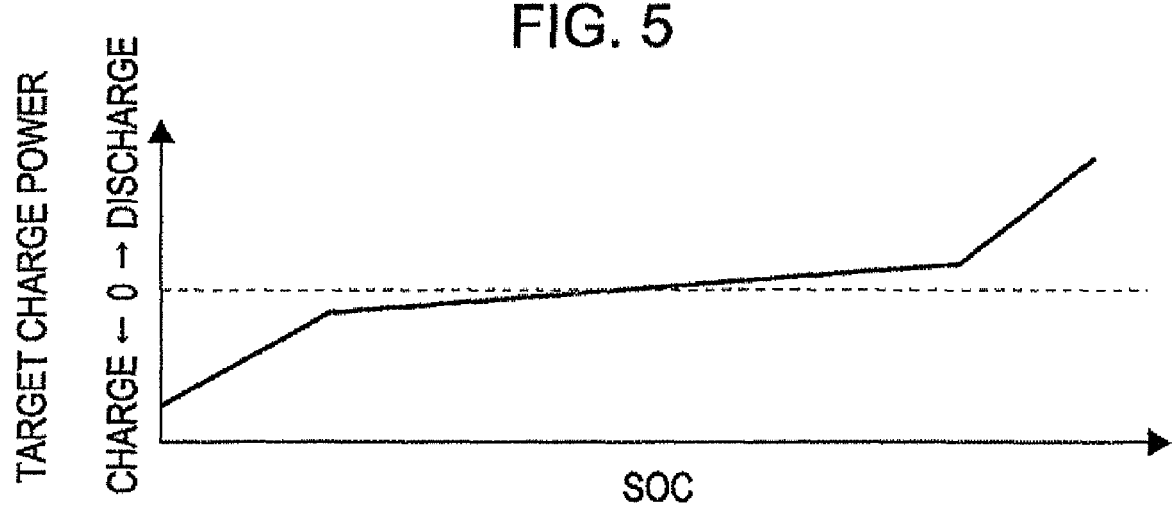
FIG. 5 is an explanatory view of a target charge power map used to calculate a target charge power in the target charge-power calculating unit shown in FIG. 2.

The target charge-power calculating unit 300 calculates a target charge power tP based on the battery state of charge SOC with reference to a target charge amount map such as that shown in FIG. 5.

Based on the accelerator opening APO, the target driving force tFo0, the target mode, the vehicle speed VSP and the target charge power tP, the operating-point directing unit 400 transiently calculates, as target values of the operating points, a target engine torque, a target motor/generator torque, a target second-clutch transmission torque capacity, a target shift position of the automatic transmission AT and a first-clutch solenoid current command. The operating-point directing unit 400 includes an engine start control unit 400a for starting the engine E when a transition from an EV drive mode to an HEV drive mode is made. Details of the engine start control unit 400a are described below with reference to FIG. 6.

The speed change control unit 500 controls the driving of a solenoid valve in the automatic transmission AT so as to achieve the target second-clutch transmission torque capacity and the target shift position.

Figure 6:
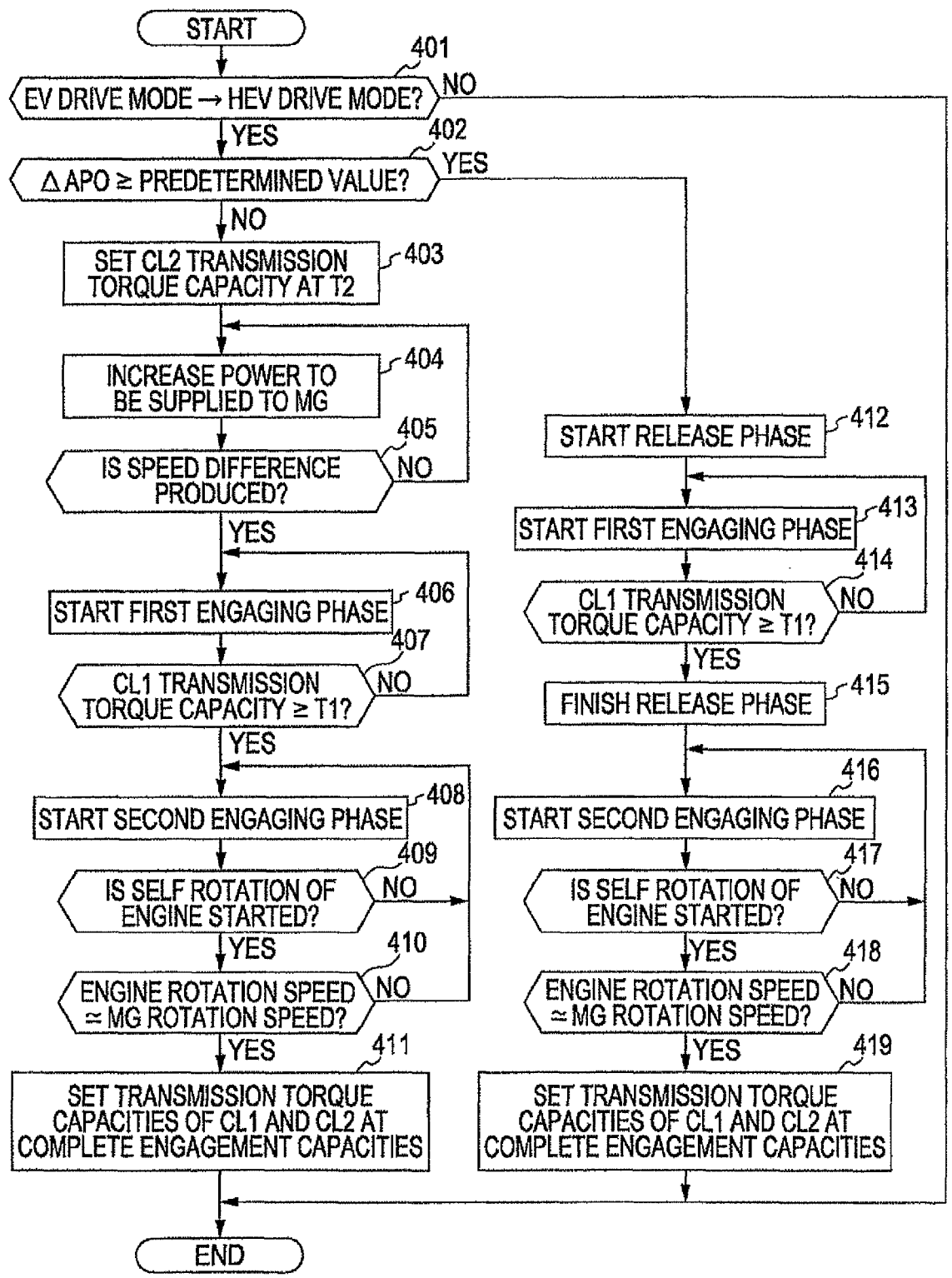
FIG. 6 is a flowchart showing an engine start control procedure in the first embodiment.

FIG. 6 is a flowchart showing a control procedure performed by the engine start control unit 400a. Steps in this control procedure are next described.

In step 401 it is determined whether a mode transition command to make a transition from an EV drive mode to an HEV drive mode has been issued. If the command has been issued, Step 402 is performed. If no command is issued, this control procedure is finished.

In step 402 it is determined whether the accelerator opening APO is greater than or equal to a predetermined value. If the APO is greater than or equal to the predetermined value, a quick engine start has been requested, and the controller jumps to step 412, which is described below. If the APO value is less than the predetermined value, step 403 is performed.

In step 403 the transmission torque capacity of the second clutch CL2 is set at a predetermined value T2. Herein, the transmission torque capacity refers to a torque that can potentially be transmitted by the second clutch CL2. This predetermined value T2 is set such that a torque equivalent to the existing torque output to the output shaft can be transmitted such that there is no influence on the output shaft torque even when the driving force output from the motor/generator MG increases.

In step 404 power to be supplied to the motor/generator MG is increased. The torque of the motor/generator MG is determined by a load acting on the motor/generator MG. Since the transmission torque capacity of the second clutch CL2 is currently limited, when the power supplied to the motor/generator MG is increased, the rotation speed of the motor/generator MG is increased. Because the second clutch CL2 slips, there is no influence on the rotation speed and torque of the output shaft.

In step 405 it is determined whether the second clutch CL2 has slipped and a predetermined speed difference has been achieved between the input rotation speed and the output rotation speed. When the speed difference is not achieved, step 404 is performed again to further increase the power supplied to the motor/generator MG. When the speed difference is achieved, step 406 is performed.

Figure 7:
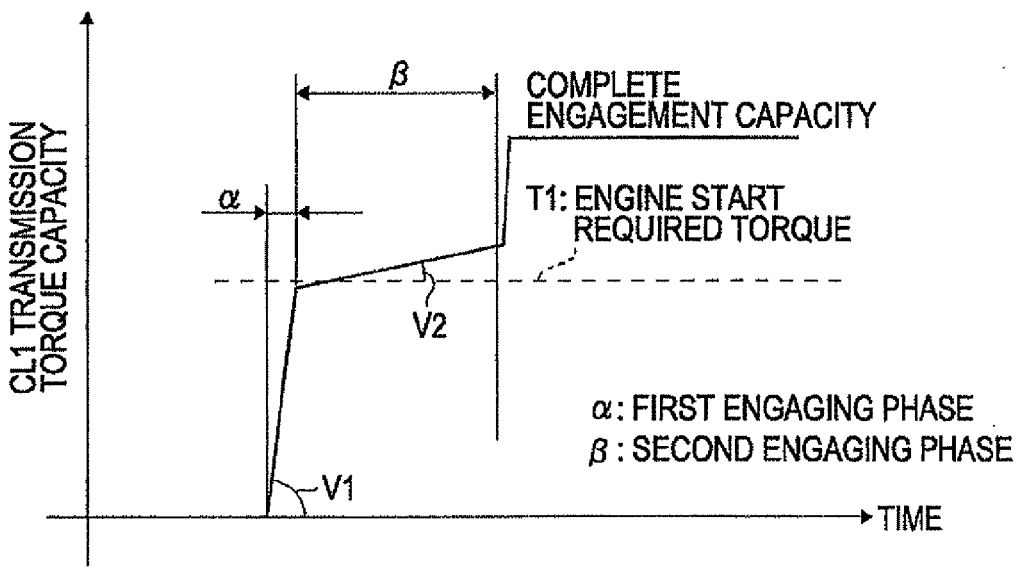
FIG. 7 is an explanatory view of a first-clutch transmission torque capacity map in the first embodiment.

In step 406, a first engaging phase as shown in a CL1 transmission torque capacity map in FIG. 7 is started to increase the rotation speed of the engine E. More specifically, the transmission torque capacity of the first clutch CL1 is increased at a predetermined velocity V1. In the CL1 transmission torque capacity map, α represents a first engaging phase, and β represents a second engaging phase.

Returning now to FIG. 6, in step 407, it is determined whether the transmission torque capacity of the first clutch CL1 has reached the predetermined value T1. If T1 is reached, the first engaging phase α has been completed, and step 408 is performed. If T1 is not reached, the transmission torque capacity of the first clutch CL1 continues to be increased in the first engaging phase α.

In step 408 a second engaging phase β is started, as shown in the CL1 transmission torque capacity map in FIG. 7. More specifically, the transmission torque capacity of the first clutch CL1 is increased at a predetermined velocity V2 that is lower than the predetermined velocity V1. In addition, fuel injection to the engine E is started during the second engaging phase β.

In step 409 it is determined whether self rotation of the engine E has started. If rotation has been initiated, step 410 is performed. If self rotation has not been initiated, step 408 is performed again to continue the second engaging phase β. This determination of whether self rotation has been initiated can be made, for example, according to whether the torque of the motor/generator MG has rapidly decreased, by timer management, or by other means.

In step 410 it is determined whether the engine speed Ne has increased and become substantially equal to the motor/generator speed Nm. When the speeds Ne and Nm are substantially equal, the second engaging phase β has been completed, and step 411 is performed. When the speeds Ne and Nm are not substantially equal, step 408 is performed again to continue the second engaging phase β. This determination is made because, when the first clutch CL1 and the second clutch CL2 are completely engaged after the completion of the second engaging phase β, as will be described below, if there is a great difference in rotation speed between the engine E and the motor/generator MG, a shock is generated to the driving wheels RR and RL via the propeller shaft PS.

In step 411 the transmission torque capacity of each of the first clutch CL1 and the second clutch CL2 is set to allow complete engagement, and the control procedure is completed. More specifically, the transmission torque capacity is set as the product of a torque to be transmitted (that is, a torque corresponding to the target driving force) and a predetermined safety ratio. Subsequently, driving is appropriately performed in an HEV drive mode.

When a response to step 402 is that the accelerator opening APO is more than or equal to the predetermined value (i.e., a quick engine start is requested), step 412 is performed, where a release phase is started in which the transmission torque capacity of the second clutch CL2 is decreased so as to release the second clutch CL2.

In steps 413 and 414 a first engaging phase is carried out similar to the above-described steps 406 and 407 to increase the rotation speed of the engine E. Subsequently, the release phase is complete in step 415 when the transmission torque capacity of the second clutch CL2 is increased again to the predetermined value T2, similar to the above-described step 403. This results in the release time for the second clutch CL2 being shorter than the time required for engine starting.

In subsequent steps 416 to 418, a second engaging phase is carried out, similar to the above-described steps 408 to 410. Then, in step 419, the transmission torque capacity of each of the first clutch CL1 and the second clutch CL2 is set such as to allow complete engagement, similarly to the above-described step 411. The control procedure is completed.

That is, when the accelerator opening APO is large, such as when the driver presses down forcefully on the accelerator pedal, quick engine start is required. Therefore, the second clutch CL2 is instantaneously released, and engine start is quickly performed while permitting some change in torque of the output shaft. In contrast, when the accelerator opening APO is small, smooth engine start is required. The transmission torque capacity T2 of the second clutch CL2 is maintained, and engine start is controlled so as to prevent a change in torque of the output shaft resulting from the engine starting.

Figure 8:
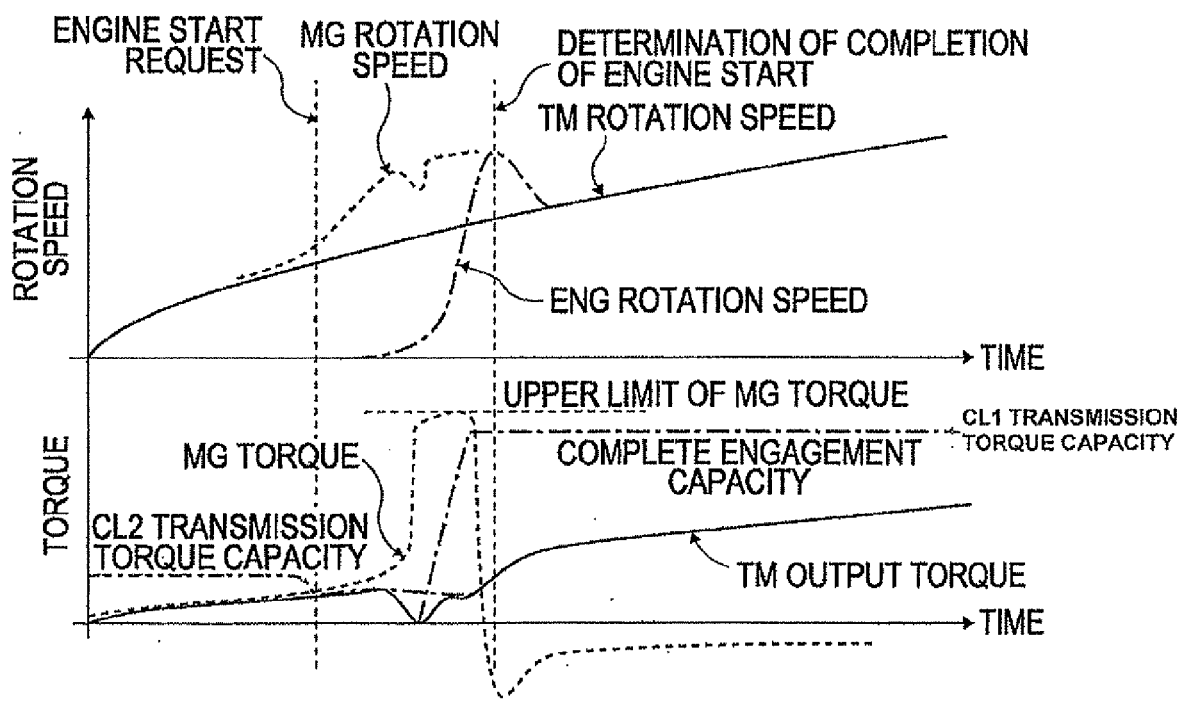
FIG. 8 is a time chart showing engine start control exerted in a comparative example.
Figure 9:
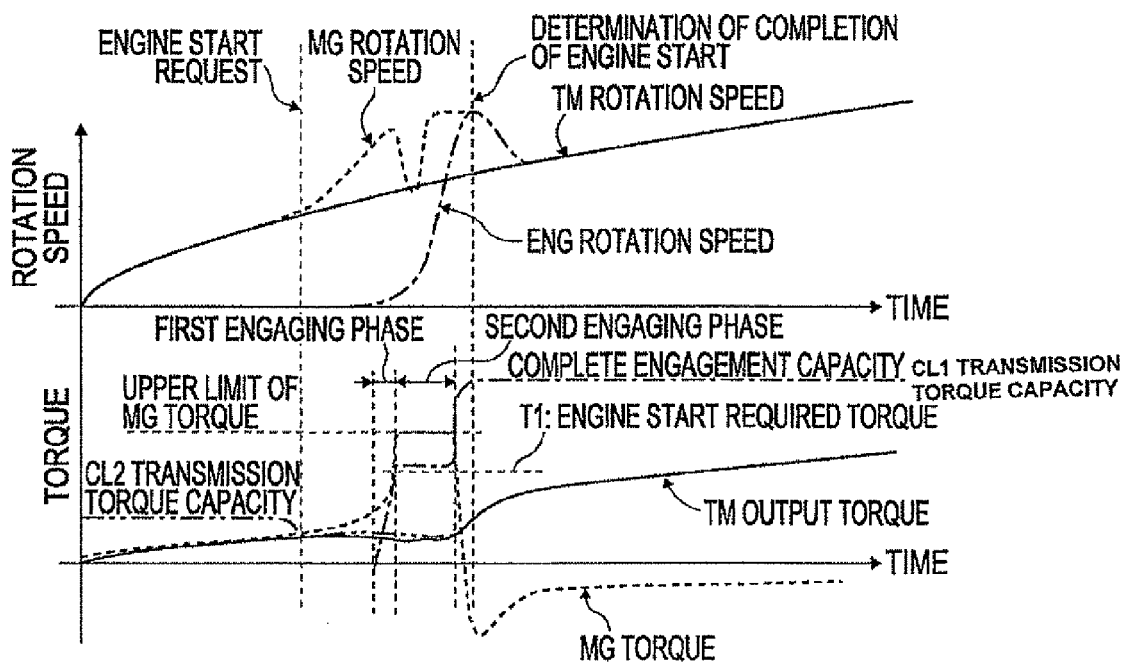
FIG. 9 is a time chart showing engine start control exerted when the accelerator opening is less than a predetermined value in the first embodiment.
Figure 10:
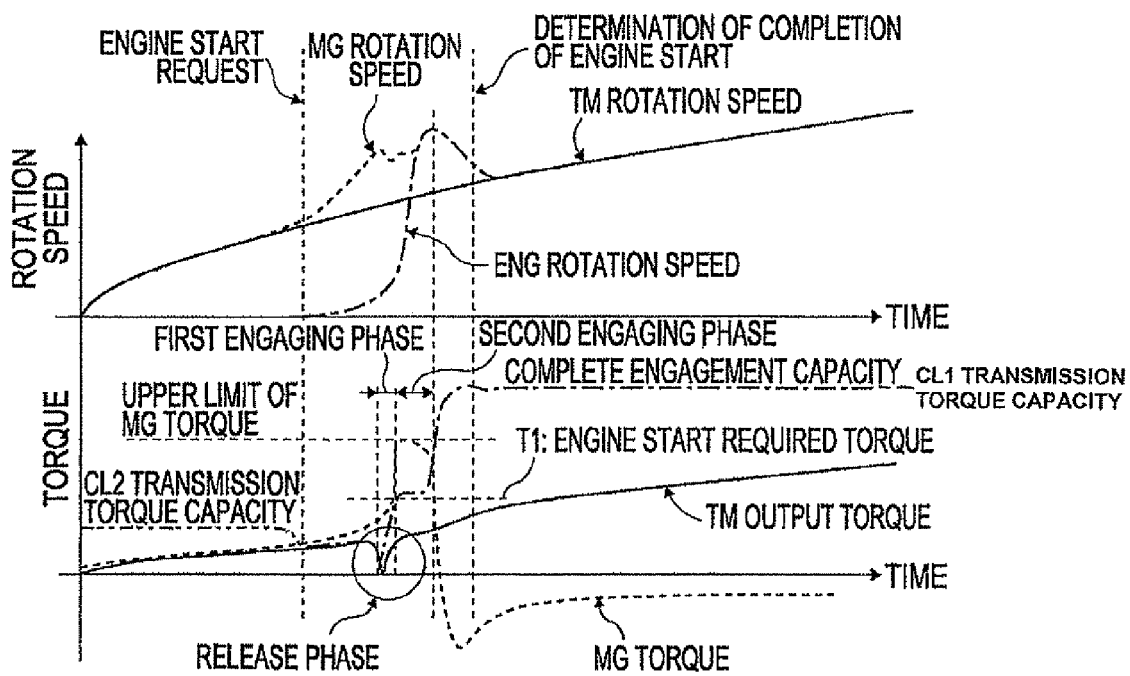
FIG. 10 is a time chart showing engine start control exerted when the accelerator opening is more than or equal to the predetermined value in the first embodiment.

The different operations of engine start control obtained by the above-described control procedure are described with reference to a comparative example. FIG. 8 is a time chart showing this comparative example wherein an engine start request is issued while driving in an EV mode. The transmission torque capacity of the first clutch CL1 is gradually increased to the transmission torque capacity for complete engagement in consideration of the safety ratio. FIG. 9 is a time chart showing the first embodiment in which an engine start request is issued while driving in an EV mode while the accelerator opening APO is less than the predetermined value. In this case, the transmission torque capacity of the first clutch CL1 is increased through the first engaging phase α and the second engaging phase β. FIG. 10 is a time chart showing another case of the first embodiment in which an engine start request is issued while driving in an EV mode while the accelerator opening APO is greater than or equal to the predetermined value. In this case, the release phase of the second clutch CL2 is carried out, and the transmission torque capacity of the first clutch CL1 is increased through the first engaging phase α and the second engaging phase β.

In FIGS. 8-10 the solid line on the rotation speed graph represents the output shaft speed (rotation speed of the propeller shaft PS) appropriately changed by the automatic transmission AT. For easy comparison with the rotation speed of the motor/generator MG, etc., this rotation speed is shown as the same value (TM speed) as the value obtained by dividing the output-shaft speed by the gear ratio (that is, the speed input to the automatic transmission AT). A dotted line on the rotation speed graph represents the speed of the motor/generator MG (MG speed), and a one-dot chain line represents the engine rotation speed.

Also in FIGS. 8-10 the solid line on the torque graph represents the output shaft torque appropriately changed by the automatic transmission AT (torque of the propeller shaft PS). For easy comparison with the other torque values, this torque is shown by the same value (TM output torque) as the value obtained by dividing the output shaft torque by the torque ratio in accordance with the gear ratio (that is, the input torque to the automatic transmission AT). A dotted line on the torque graph represents the torque of the motor/generator MG (MG torque), a one-dot chain line represents the transmission torque capacity of the first clutch CL1 (CL1 transmission torque capacity), and a two-dot chain line represents the transmission torque capacity of the second clutch CL2 (CL2 transmission torque capacity).

The operation of an engine start according to the comparative example is shown in FIG. 8. As shown therein, when the vehicle is started in an EV drive mode, the transmission torque capacity of the second clutch CL2 (CL2 transmission torque capacity) is set at the capacity that allows complete engagement (transmission torque capacity obtained by multiplying the torque to be transmitted by a predetermined safety ratio). Only the driving force of the motor/generator MG is transmitted to the automatic transmission AT. In this case, the TM output torque is equal to the MG torque.

When an engine start request is issued in this state (a state in which the engine E is stopped and the first clutch CL1 is released), the transmission torque capacity of the second clutch CL2 is set at a value equal to the output shaft torque in driving before engine start up, and the driving force of the motor/generator MG is increased. Then, only the transmission torque capacity of the second clutch CL2 acts as the load on the motor/generator MG. Therefore, the rotation speed of the motor/generator MG is increased by excessive drive force. Since the TM output torque is determined by the transmission torque capacity of the second clutch CL2, the TM output torque does not change.

When the transmission torque capacity of the first clutch CL1 is increased, the load acting on the motor/generator MG is increased. Therefore, the torque of the motor/generator MG increases with the increase in the transmission torque capacity of the first clutch CL1. In this case, if the transmission torque capacity of the first clutch CL1 is increased to the capacity for complete engagement, which is higher than the torque required to start the engine E, the engine E rapidly absorbs the torque before starting self rotation (as the engine speed rapidly increases, the torque is consumed). Torque transmitted to the second clutch CL2 is reduced. Consequently, the TM output torque is decreased as shown in FIG. 8. This may cause the driver to feel that the vehicle driving force has decreased.

FIG. 9 depicts the operation of the first described embodiment when the accelerator opening APO is less than the predetermined value. In FIG. 9, the stage before the engine start request is issued operates in the same manner as the same stage in the above-described comparative example. Therefore, a description will be given only of the operation after the engine start request is issued.

As shown in FIG. 9, at the time the engine start request is issued the transmission torque capacity of the second clutch CL2 is set at a value equal to the output shaft torque TM before engine starting, and the driving force of the motor/generator MG is increased. Since only the transmission torque capacity of the second clutch CL2 acts as the load on the motor/generator MG, the speed of the motor/generator MG is increased by excessive driving force. Since the TM output torque is determined by the transmission torque capacity of the second clutch CL2, it does not change.

After the engine start request is issued, a first engaging phase is started at the time when the driving force of the motor/generator MG has been sufficiently increased (for example, the time when the speed of the motor/generator MG has exceeded the TM speed by a predetermined amount). In this first engaging phase, the transmission torque capacity of the first clutch CL1 is increased to a predetermined value T1 at a predetermined velocity V1 so as to increase the engine rotation speed as quickly as possible. The first engaging phase aims to quickly increase the transmission torque capacity of the first clutch CL1 to the predetermined value T1 (torque required to start the engine E) while preventing the transmission torque capacity from exceeding the predetermined value T1. When the transmission torque capacity of the first clutch CL1 is increased to the predetermined value T1, the first engaging phase is complete, and a second engaging phase is initiated. The determination whether the transmission torque capacity is increased to the predetermined value T1 can be made, for example, by detecting an actual value corresponding to the engagement torque (i.e., engaging hydraulic pressure), by timer management based on experiment with some allowance, or by other means.

In the second engaging phase, the transmission torque capacity of the first clutch CL1 is changed at a predetermined velocity V2 that is lower than the predetermined velocity V1 adopted in the first engaging phase. The load acting on the motor/generator MG increases, and the torque of the motor/generator MG correspondingly increases. In this case, since the transmission torque capacity of the first clutch CL1 is increased only to the value equivalent to the torque required for engine starting, the engine E does not absorb the torque too much before starting self rotation. Therefore, the torque transmitted to the second clutch CL2 does not decrease. This can prevent the driver from feeling that the vehicle driving force has decreased.

FIG. 10 depicts the operation of the first described embodiment when the accelerator opening APO is greater than or equal to the predetermined value. In FIG. 10, since the stage before the engine start request is issued is the same as the equivalent stage in the above-described comparative example, a description will be given only of the operation after the engine start request is issued.

As shown in FIG. 10, at the time the engine start request is issued, the transmission torque capacity of the second clutch CL2 is set at a value equal to the output shaft torque TM before engine starting, and the driving force of the motor/generator MG is increased. Since only the transmission torque capacity of the second clutch CL2 acts as the load on the motor/generator MG, the speed of the motor/generator MG is increased by excess driving force. Since the TM output torque is determined by the transmission torque capacity of the second clutch CL2, the TM output torque does not change.

In this case, the accelerator opening APO is greater than or equal to the predetermined value, meaning, for example, that the driver demands to a quick acceleration. Since this requires a quicker engine start up, the transmission torque capacity of the first clutch CL1 is controlled similar to the control in FIG. 9, while the second clutch CL2 is controlled in a release phase, which is carried out simultaneously with initiation of the first engaging phase.

Specifically, after the engine start request is issued, the first engaging phase is initiated at the time when the driving force of the motor/generator MG has sufficiently increased (for example, the time when the speed of the motor/generator MG has exceeded the TM speed by a predetermined amount). Simultaneously, the release phase of the second clutch CL2 is carried out.

In the first engaging phase, the transmission torque capacity of the first clutch CL1 is increased to the predetermined value T1 at the predetermined velocity V1 so as to increase the engine speed as quickly as possible. Simultaneously, when the transmission torque capacity of the second clutch C2 is instantaneously decreased by the release phase, all driving force of the motor/generator MG is used to instantaneously increase the engine speed. Consequently, the engine speed starts to rapidly increase.

In this way, since all driving force of the motor/generator MG is instantaneously used for engine start up, quick engine start up can be achieved while minimizing the influence on the TM output torque. Further, the speed of the motor/generator MG can be prevented from decreasing at the start of the first engaging phase, and the driving force required to increase the speed of the motor/generator MG again can be limited. This allows the TM output torque to be increased more quickly.

Since the operation after the first engaging phase is the same as the equivalent stage described in reference to FIG. 9 in which the accelerator opening APO is less than the predetermined value, a description thereof is omitted.

Embodiments of the hybrid-vehicle engine start controlling apparatus disclosed herein provide operational advantages over conventional engine starts. One such advantage is the prevention of a decrease in driving force felt by the driver due to operation of the first engaging phase and the second engaging phase. In the first engaging phase, the transmission torque capacity of the first clutch CL1 is increased at the predetermined velocity V1 (first velocity). In the second engaging phase, the transmission torque capacity of the first clutch CL1 is changed at the predetermined velocity V2 (second velocity), which is lower than the predetermined velocity V1 of the first engaging phase.

Because the transmission torque capacity of the first clutch CL1 is quickly increased in the first engaging phase, the speed of the engine E can increase quickly. Further, since the transmission torque capacity is increased at a lower velocity in the second engaging phase than the first engaging phase, the torque capacity increase is minimized, and the driving torque of the motor/generator MG is not absorbed more than necessary by the engine E. Consequently, the torque output to the output shaft of the motor does not decrease, and the driver is prevented from feeling that the vehicle driving force has decreased.

This means that the transmission torque capacity of the first clutch CL1 is increased so as not to exceed the torque T1 required for engine start by a predetermined amount. If the transmission torque capacity of the first clutch CL1 is increased to the capacity for complete engagement that is higher than the torque required for engine start, the engine E rapidly absorbs the torque before starting self rotation. Torque transmitted to the second clutch CL2 is thus reduced. Accordingly, by increasing the transmission torque capacity of the first clutch CL1 so as not to exceed T1 by a predetermined value, the driving force of the motor/generator MG is prevented from being transmitted more than required to the engine E, and the driver does not feel that the vehicle driving force has decreased.

Herein, "a predetermined value" as used in "increasing the transmission torque capacity of the first clutch CL1 so as not to exceed T1 by a predetermined value" refers to an appropriate value set in accordance with, for example, the rated current of the motor/generator MG. Since the power that can be supplied to the motor/generator MG has an upper limit, when the relationship between the speed and torque output to the second clutch CL2 is maintained, upper limits of the speed and torque output to the first clutch CL1 are determined exclusively. Preventing the decrease in driving force can be achieved by increasing the transmission torque capacity of the first clutch CL1 to a value within this range that ensures the torque required for engine starting.

A second advantage of embodiments taught herein is the conservation of energy. In the first engaging phase, the transmission torque capacity of the first clutch CL1 is increased to the value corresponding to the torque T1 required to start the engine. By limiting the torque to the torque T1 necessary, energy loss is minimized because excessive torque is not supplied to the engine E.

Another advantage of embodiments of the invention is the minimization of change in output shaft torque. When an engine start request is issued, the transmission torque capacity of the second clutch CL2 is set at a value equal to the output shaft torque before engine starting. Therefore, only the transmission torque capacity of the second clutch CL2 acts as the load on the motor/generator MG. While the rotation speed of the motor/generator MG is increased by the increased driving force of the motor/generator MG, the TM output torque does not change because it is determined by the transmission torque capacity of the second clutch CL2. Consequently, the change in the output shaft torque due to engine starting can be minimized.

Yet another advantage is the shortened time of engine start up. In the release phase, the transmission torque capacity of the second clutch CL2 is decreased for a time shorter than the time required for engine start up. In this case, the output shaft torque slightly changes, but the engine E can start more quickly.

Yet another advantage is the ability to control the engine to reproduce the driver's demands. Only when the accelerator opening APO (required driving force) is greater than or equal to the predetermined value is the release phase is carried out. Therefore, engine start can be controlled as intended by the driver.

In the above-described first embodiment, the transmission torque capacity of the first clutch CL1 is increased in the first engaging phase and the second engaging phase. In contrast, in a second embodiment, a third engaging phase is carried out in addition to first and second engaging phases.

Figure 11:
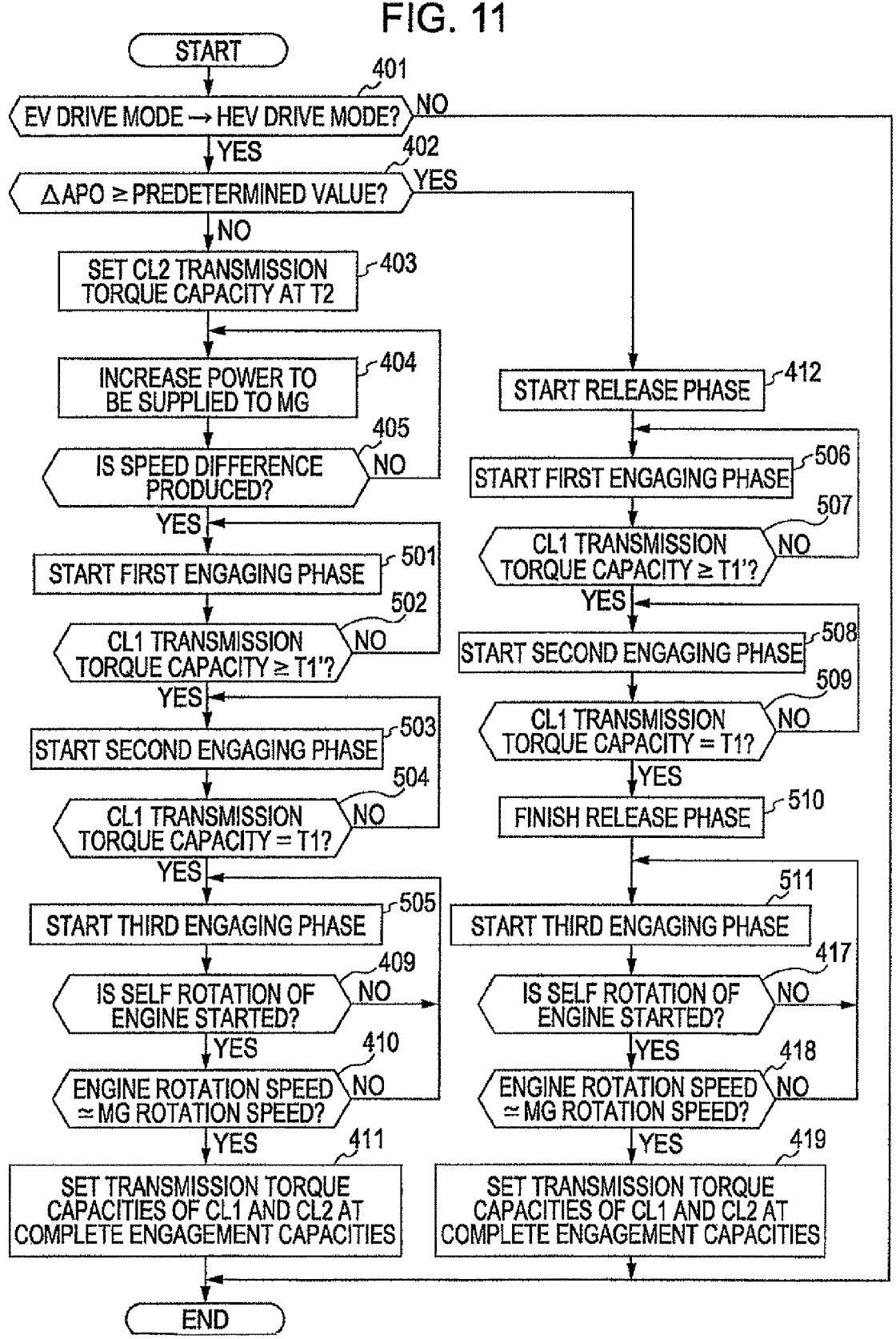
FIG. 11 is a flowchart showing an engine start control procedure in a second embodiment.
Figure 12:
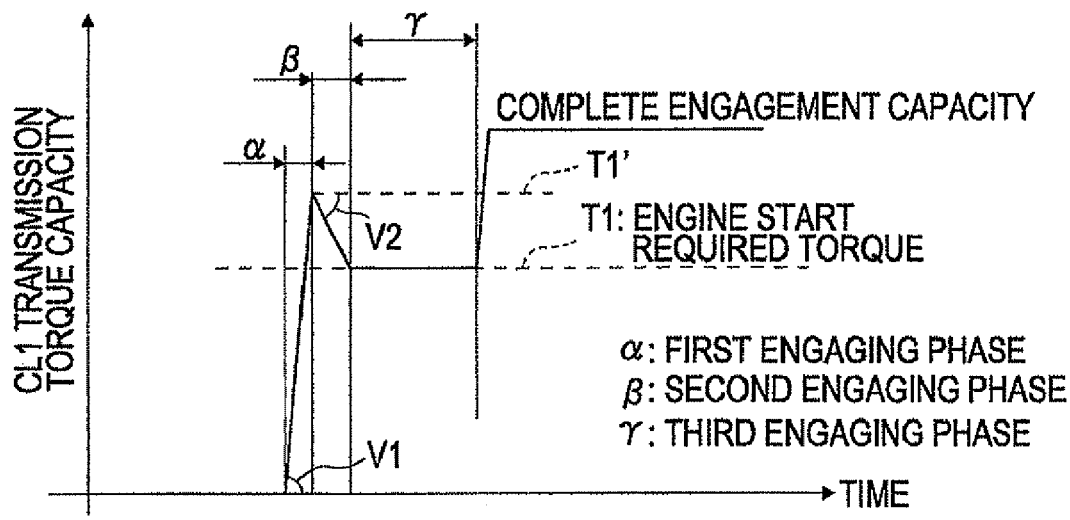
FIG. 12 is an explanatory view of a first-clutch transmission torque capacity map in the second embodiment.

FIG. 11 is a flowchart showing an engine start control procedure according to the second embodiment, and FIG. 12 is a CL1 transmission torque capacity map adopted in the second embodiment. Some basic steps are the same as those in the first embodiment (steps 401 to 405, steps 409 to 412, step 418 and step 419), and therefore, a description will be given only for different and/or additional steps.

Engine start control is now described. Similar to the first embodiment, when it is determined in step 402 that the accelerator opening APO is less than a predetermined value, the procedure continues with step 403 and subsequent steps. In FIG. 11, steps 501 to 505 replace steps 406 to 408 of the first embodiment shown in FIG. 6 and so will be described respectively.

In step 501 a first engaging phase as shown in the CL1 transmission torque capacity map in FIG. 12 is started to increase the rotation speed of the engine E. More specifically, the transmission torque capacity of the first clutch CL1 is increased at a predetermined velocity V1. In step 502, the transmission torque capacity of the first clutch CL1 is determined. If the transmission torque capacity of first clutch CL1 has reached a predetermined value T1', the first engaging phase is complete, and step 503 is performed. If the transmission torque capacity has not reached T1', the transmission torque capacity is further increased in the first engaging phase. The predetermined value T1' is set to be larger than the torque T1 required for engine starting.

In step 503 a second engaging phase is started, as shown in the CL1 transmission torque capacity map of FIG. 12. The velocity of the transmission torque capacity of the first clutch CL1 is set at a predetermined negative value V2 so that the transmission torque capacity is decreased. The value of velocity V2 is less than velocity V1.

In step 504 a determination is made as to whether the transmission torque capacity of the first clutch CL1 has reached the torque T1 required for engine starting. If the necessary torque T1 has been reached, the second engaging phase is complete. Then, step 505 is performed. If T1 has not been reached, step 503 is performed again to continue the second engaging phase until T1 is reached.

In step 505 a third engaging phase is started as shown in the CL1 transmission torque capacity map of FIG. 12. The transmission torque capacity of the first clutch CL1 is maintained at the predetermined value T1. In addition, fuel injection to the engine E is initiated during the third engaging phase.

When the response to the query in step 402 indicates that the accelerator opening APO is greater than or equal to the predetermined value, processing proceeds to step 412. Steps 413 to 416 of FIG. 6 are replaced with steps 506 to 511 in FIG. 11. Because Steps 506 to 512 are different from the first described embodiment, they will be described respectively.

In steps 506 to 509, the first and second engaging phases are carried out similarly to steps 501 to 504 to increase the rotation speed of the engine E. In Step 510, the transmission torque capacity of the second clutch CL2 is increased again to a predetermined value T2, and the release phase is complete. That is, the time required to release the second clutch CL2 is shorter than the time required for engine starting.

In step 511 a third engaging phase is started similarly to step 505 to maintain the transmission torque capacity of the first clutch CL1 at the predetermined value T1. The procedure then picks up with step 417 and subsequent steps as described with reference to FIG. 6 for the first described embodiment.

Figure 13:
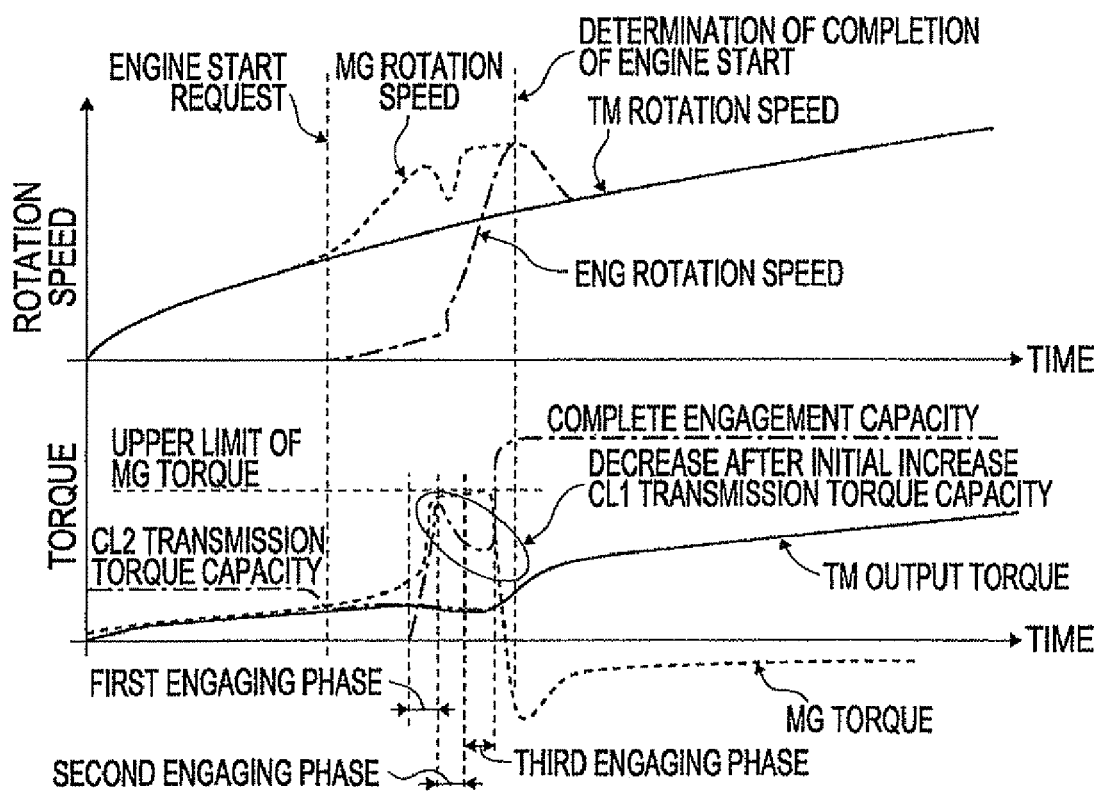
FIG. 13 is a time chart showing engine start control exerted when the accelerator opening is less than a predetermined value in the second embodiment.

The operation of the control procedure according to the above-described flowchart is described with reference to FIG. 13. FIG. 13 is a time chart depicting the second embodiment in which an engine start request is issued when the accelerator opening APO is less than the predetermined value, and the transmission torque capacity of the first clutch CL1 is increased through the first, second and third engaging phases.

The first engaging phase is initiated when an engine start request is issued and the driving force of the motor/generator MG has increased sufficiently (for example, when the speed of the motor/generator MG has exceeded the TM speed by a predetermined amount).

In the first engaging phase, the transmission torque capacity of the first clutch CL1 is quickly increased to the predetermined value T1' (larger than the torque required to start the engine E) at the predetermined velocity V1 so that the engine speed can increase as quickly as possible.

When the transmission torque capacity of the first clutch CL1 is increased to the predetermined value T1', the first engaging phase is completed, and the second engaging phase is then started. The determination whether the transmission torque capacity has increased to the predetermined value T1' can be made, for example, by detecting an actual value corresponding to the transmission torque capacity (i.e., engaging hydraulic pressure), by time management based on experiment with some allowance, or by other means.

In the second engaging phase, the transmission torque capacity of the first clutch CL1 is decreased at the predetermined negative velocity V2, velocity V2 being lower than the predetermined velocity V1 adopted in the first engaging phase. Then, the load acting on the motor/generator MG decreases, preventing the decrease in the MG speed. Therefore, the motor/generator MG can be driven more efficiently before the engine E starts self rotation, and the TM output torque can be quickly established.

Although not shown in the time chart, when an engine start request is issued while driving in an EV mode in the second embodiment in which the accelerator opening APO is greater than or equal to the predetermined value, the release phase of the second clutch CL2 is started simultaneously with the start of the first engaging phase in a manner similar to that described for the first embodiment. The release phase is continued until the second engaging phase is completed.

In addition to those advantages of the first embodiment described above, the hybrid-vehicle engine start controlling apparatus according to the second embodiment provides for more efficient use of the motor/generator MG.

In the first engaging phase, the transmission torque capacity of the first clutch CL1 is increased to the value T1' larger than the torque T1 required for engine starting. In the second engaging phase, the transmission torque capacity that was increased in the first engaging phase is decreased. Accordingly, the motor/generator MG can be more efficiently operated by preventing the decrease in the speed of the motor/generator MG, and the TM output torque can be quickly established.

While the hybrid-vehicle engine start controlling apparatus taught herein has been described above with reference to the first and second embodiments, structures are not limited to those in these embodiments. Modifications and additions are possible without departing from the scope of the invention claimed in the attached claims.

Figure 14A:
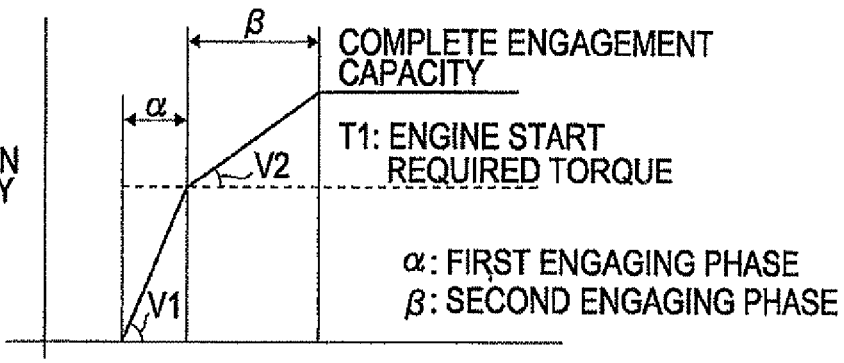
FIGS. 14A to 14D are explanatory views of first-clutch transmission torque capacity maps in certain embodiments.

FIGS. 14A to 14D show other examples of the CL1 transmission torque capacity map. For example, control may be exerted as shown in FIG. 14A. In this case, the transmission torque capacity of the first clutch CL1 is rapidly increased to the torque T1 required for engine starting in the first engaging phase and is gradually increased from the torque T1 to the transmission torque capacity for complete engagement calculated using the predetermined safety ratio in the second engaging phase.

Figure 14B:
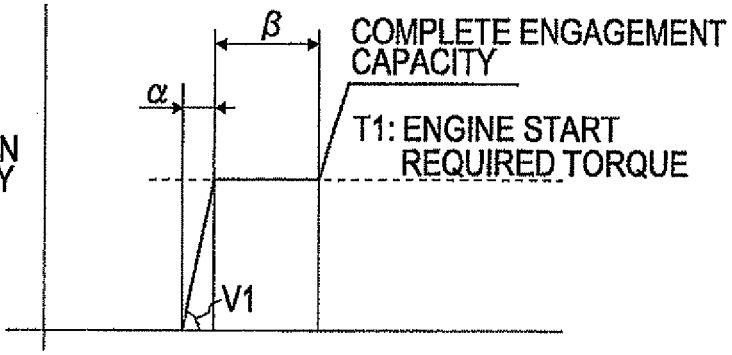

In the control scheme shown in FIG. 14B, the transmission torque capacity of the first clutch CL1 is rapidly increased to the required torque T1 in the first engaging phase, is maintained at the torque T1 for a predetermined period in the second engaging phase and is increased to the capacity for complete engagement in response to the determination that the engine start has been completed.

Figure 14C:
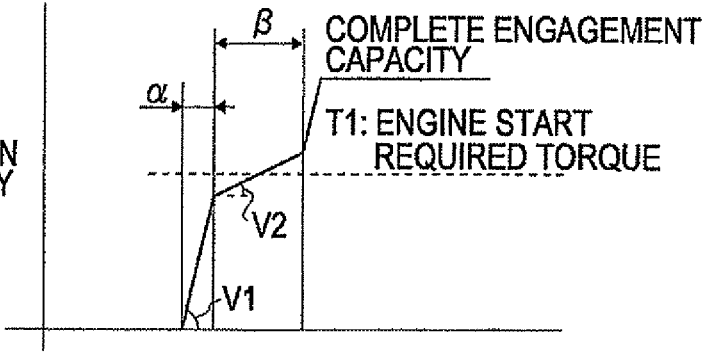

Alternatively, in the control scheme shown in FIG. 14C, the transmission torque capacity is rapidly increased to a value slightly smaller than the required torque T1 in the first engaging phase and is gradually increased in the second engaging phase so as to exceed the torque T1.

Figure 14D:
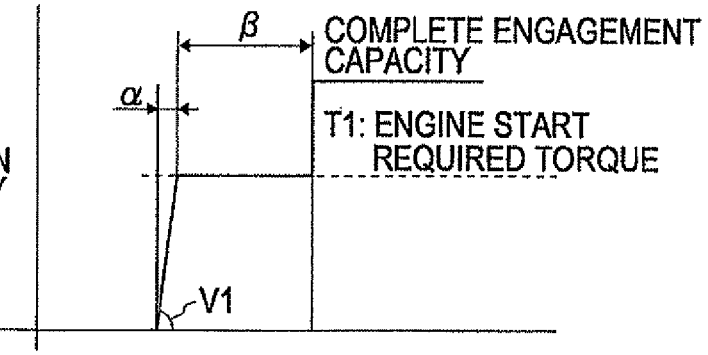

In the control scheme shown in FIG. 14D, the transmission torque capacity of the first clutch CL1 is rapidly increased to the required torque T1 in the first engaging phase, is maintained at the torque T1 for a predetermined period in the second engaging phase and is increased stepwise to the transmission torque capacity for complete engagement in response to the determination that the engine start has been completed.

While the embodiments described herein are applied to the rear-drive hybrid vehicle, the invention is also applicable to a front-drive hybrid vehicle and a four-wheel-drive hybrid vehicle. While the clutch built in the automatic transmission is adopted as the second clutch in the first and second embodiments, a second clutch may be added between the automatic transmission and the driving wheels (for example, see Japanese Unexamined Patent Application Publication No. 2002-144921). Further, the present invention is also applicable to a hybrid vehicle including only a first clutch (engine clutch).

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A hybrid-vehicle engine start control system, comprising:
   an engine;
   a motor disposed between the engine and a vehicle driving shaft;

a first clutch disposed between the engine and the motor, the first clutch operable to engage and disengage the engine;
a second clutch disposed between the motor and the vehicle driving shaft and operable to engage and disengage the vehicle driving shaft; and
a controller configured to:
  correspond a transmission torque capacity of the second clutch to a vehicle driving shaft torque when the engine is disengaged;
  increase a driving torque of the motor in response to a request for an increase in a driving force; and
  start the engine from a disengaged state, including:
    increase a transmission torque capacity of the first clutch at a first velocity in a first engaging phase;
    change the transmission torque capacity of the first clutch at a second velocity slower than the first velocity in a second engaging phase after the first engaging phase is complete; and
    decrease the transmission torque capacity of the second clutch for a time shorter than a time required to start the engine in a release phase of the start of the engine, wherein the release phase is performed only if a requested driving force is more than or equal to a predetermined value.

2. The control system according to claim 1 wherein the controller is further operable to increase the transmission torque capacity of the first clutch in the first engaging phase to correspond to a torque required to start the engine.

3. The control system according to claim 1 wherein the controller is further operable to:
  increase the transmission torque capacity of the first clutch in the first engaging phase to a value greater than a torque required to start the engine; and
  decrease the transmission torque capacity of the first clutch in the second engaging phase to the torque required to start the engine.

4. The control system according to claim 3 wherein the controller is further operable to:
  maintain the transmission torque capacity of the first clutch at the torque required to start the engine in a third engaging phase after the second engaging phase; and
  start a fuel injection to the engine.

5. The control system according to claim 1 wherein the controller is further operable to:
  start the release phase and the first engaging phase simultaneously.

6. The control system according to claim 1 wherein the controller is further operable to:
  instruct the second clutch to slip to maintain a target vehicle driving shaft torque at a vehicle driving shaft torque when the engine is disengaged; and wherein the slip occurs when the driving torque of the motor is increased.

7. The control system according to claim 1 wherein the increase in driving torque corresponds to an accelerator opening.

8. The hybrid-vehicle engine start control system according to claim 1 wherein the second engaging phase further comprises a fuel injection to the engine.

9. A method for controlling the engine start of a hybrid-vehicle, the hybrid-vehicle including a motor, an engine and a first clutch disposed between the motor and the engine to engage and disengage the engine, the method comprising:
  increasing a driving torque of the motor;
  increasing a transmission torque capacity of the first clutch at a first velocity;
  changing the transmission torque capacity of the first clutch to a second velocity slower than the first velocity so as to conform a rotation speed of the engine to a rotation speed of the motor;
  corresponding a transmission torque capacity of a second clutch disposed between the motor and the vehicle driving shaft and operable to engage and disengage the motor and the vehicle driving shaft to an output shaft torque, wherein the correspondence is performed prior to increasing the driving torque of the motor; and
  decreasing the transmission torque capacity of the second clutch for a time shorter than a time required to start the engine if a requested driving force is more than or equal to a predetermined value.

10. The method according to claim 9 wherein increasing the transmission torque capacity of the first clutch at the first velocity further comprises increasing the torque transmission capacity to greater than a torque required to start the engine; and wherein changing the torque transmission capacity of the first clutch to a second velocity slower than the first velocity further comprises reducing the transmission torque capacity of the first clutch to a torque required to start the engine.

11. The method according to claim 10, further comprising:
  maintaining the transmission torque capacity of the first clutch at the torque required to start the engine; and
  initiating fuel injection to the engine while maintaining the transmission torque capacity.

12. The method according to claim 9, further comprising:
  slipping the second clutch to maintain the output shaft torque while increasing the driving torque of the motor.

13. The method according to claim 9, further comprising:
  simultaneously decreasing the transmission torque capacity of the second clutch and beginning increasing the transmission torque capacity of the first clutch at the first velocity.

14. A hybrid-vehicle engine start control system, comprising:
  an engine;
  a motor disposed between the engine and a vehicle driving shaft;
  a first clutch disposed between the engine and the motor, the first clutch engaging and disengaging the engine;
  a second clutch disposed between the motor and the vehicle driving shaft and operable to engage and disengage the motor and vehicle driving shaft; and
  a controller operable to start the engine from a disengaged state, the controller configured to:
    correspond a transmission torque capacity of the second clutch to a vehicle driving shaft torque when the engine is disengaged;
    increase a driving torque of the motor;
    increase a transmission torque capacity of the first clutch to a torque required to start the engine, thereby initiating a rotation speed of the engine;
    further increase the transmission torque capacity of the first clutch until the rotational speed of the engine conforms to a rotational speed of the motor; and
    decrease the transmission torque capacity of the second clutch for a time shorter than a time required to start the engine in a release phase of the start of the engine, wherein the release phase is performed only if a requested driving force is more than or equal to a predetermined value.

15. An engine start controller for a hybrid vehicle, the vehicle including a motor, an engine, a first clutch disposed between the motor and the engine to engage and disengage the engine and a second clutch disposed between the motor and the vehicle driving shaft and operable to engage and disengage the motor and the vehicle driving shaft, the controller comprising:
- means for corresponding a transmission torque capacity of the second clutch to a vehicle driving shaft torque when the engine is disengaged;
- means for increasing a driving torque of the motor;
- means for increasing a transmission torque capacity of the first clutch at a first velocity; and
- means for changing the transmission torque capacity of the first clutch to a second velocity slower than the first velocity so as to conform a rotation speed of the engine to a rotation speed of the motor; and
- means for decreasing the transmission torque capacity of the second clutch for a time shorter than a time required to start the engine in a release phase of the start of the engine wherein the release phase is performed only if a requested driving force is more than or equal to a predetermined value.

* * * * *